United States Patent
Shen et al.

(10) Patent No.: US 8,632,152 B2
(45) Date of Patent: Jan. 21, 2014

(54) METHOD AND DEVICE FOR PRINTING IMAGE

(75) Inventors: Jinghua Shen, Beijing (CN); Yapeng Chen, Beijing (CN); Bin Yang, Beijing (CN); Lidong Wang, Beijing (CN)

(73) Assignees: Peking University Founder Group Co., Ltd., Beijing (CN); Beijing Founder Electronics Co., Ltd, Beijing (CN)

( * ) Notice: Subject to any disclaimer, the term of this patent is extended or adjusted under 35 U.S.C. 154(b) by 381 days.

(21) Appl. No.: 12/920,267

(22) PCT Filed: Feb. 27, 2009

(86) PCT No.: PCT/CN2009/070591
§ 371 (c)(1),
(2), (4) Date: Dec. 13, 2010

(87) PCT Pub. No.: WO2009/106016
PCT Pub. Date: Sep. 3, 2009

(65) Prior Publication Data
US 2011/0085002 A1 Apr. 14, 2011

(30) Foreign Application Priority Data
Feb. 29, 2008 (CN) .......................... 2008 1 0101234

(51) Int. Cl.
*B41J 29/38* (2006.01)
*B41J 29/393* (2006.01)
*B41J 2/15* (2006.01)

(52) U.S. Cl.
USPC ................................. 347/14; 347/19; 347/41

(58) Field of Classification Search
USPC ..................... 347/5, 19, 14–15, 41
See application file for complete search history.

(56) References Cited

U.S. PATENT DOCUMENTS

| | | | |
|---|---|---|---|
| 5,990,924 A | 11/1999 | Kido et al. | |
| 6,192,184 B1 | 2/2001 | Shiota et al. | |
| 6,683,996 B1 | 1/2004 | Walmsley | |
| 7,554,690 B2 | 6/2009 | Kim | |
| 7,672,011 B2 | 3/2010 | Kato et al. | |
| 2003/0007024 A1* | 1/2003 | Fujimori | 347/15 |
| 2007/0052747 A1* | 3/2007 | Kim | 347/19 |
| 2008/0219736 A1 | 9/2008 | Lynggaard | |

FOREIGN PATENT DOCUMENTS

| | | |
|---|---|---|
| CN | 1188287 A | 7/1998 |
| CN | 1192326 C | 3/2005 |
| CN | 1927587 A | 3/2007 |
| EP | 0843284 A2 | 5/1998 |
| EP | 1345414 A2 | 9/2003 |
| WO | 2005078569 A1 | 8/2005 |

OTHER PUBLICATIONS

ISR of PCT/CN2009/070591 dated May 28, 2009.

* cited by examiner

*Primary Examiner* — Jason Uhlenhake
(74) *Attorney, Agent, or Firm* — Lowe Hauptman & Ham, LLP

(57) ABSTRACT

Disclosed is a method for printing an image, comprising a step of rasterizing an image to be printed in view of a first resolution to generate a first data bitmap; a step of splitting the first data bitmap according to a ratio of the first resolution to a second resolution to generate second data bitmaps; and a step of outputting the second data bitmaps to a printer with the second resolution for printing. Disclosed is also a device for printing images. The method and device for printing an image may solve the problem in the prior art that the definition of an image printed from a printer is too low and improve the definition of an image printed from a printer.

14 Claims, 11 Drawing Sheets

METHOD AND DEVICE FOR PRINTING IMAGE

RELATED APPLICATIONS

The present application is National Phase of PCT/CN2009/070591 filed Feb. 27, 2009, and claims priority from, Chinese Application Number 200810101234 filed Feb. 29, 2008.

TECHNICAL FIELD

The invention belongs to the field of digital printing and relates to a method and device for printing an image.

BACKGROUND

Currently, when an image is printed by a printer, the image to be printed is rasterized by using the print driver in view of the resolution of the printer so as to form a data bitmap. Then, a first row of the data bitmap is sent to the printer for printing. After the first row is completely printed, an ink head of the printer moves to the next row and a second row of the data bitmap is sent to the printer for printing. Other rows of the data bitmap are processed similarly, until the data bitmap is printed completely.

In practice, the following technical problems in the prior art are encountered.

Since the definition of an image printed depends on the resolution of the printer, the resolution of the printer's hardware must be improved for improving the definition. However, it is difficult to improve the resolution of the hardware of some common low-level printers due to limitations of the memory and ink head of the printers, which could not satisfy the user's requirements on definition.

SUMMARY

The present invention provides methods and devices for printing an image to solve the problem in the prior art that the definition of an image printed from a printer is too low.

The present invention provides a method for printing an image, comprising rasterizing an image to be printed in view of a first resolution to generate a first data bitmap; splitting the first data bitmap according to a ratio of the first resolution to a second resolution to generate second data bitmaps; and outputting the second data bitmaps to a printer with the second resolution for printing.

The present invention also provides a device for printing images, comprising a rasterization processing unit for rasterizing an image to be printed in view of a first resolution to generate a first data bitmap; a bitmap splitting unit for splitting the first data bitmap according to a ratio of the first resolution to a second resolution to generate second data bitmaps; and an outputting and printing unit for outputting the second data bitmaps to a printer with the second resolution for printing.

The present invention has at least on of the following advantages. When an image is to be printed, the image is rasterized in view of a first resolution so as to generate a first data bitmap. The first data bitmap is then split according to a ratio of the first resolution to a second resolution so as to form second data bitmaps. Finally, the second data bitmaps are outputted to a printer with the second resolution for printing. By utilizing the method of the invention, an image with the high resolution can be printed by a printer with the low resolution without modifying the hardware of the printer, so as to improve the definition of the printed image.

BRIEF DESCRIPTION OF THE DRAWINGS

The present invention is not limited to the descriptions and embodiments described hereinafter with reference to the appended drawings, wherein.

DETAILED DESCRIPTION OF EMBODIMENTS

Hereinafter, a detailed description of embodiments of the present invention will be given with reference to the appended drawings.

To improve a definition of a printed image output from a printer, a method for printing an image is provided according to an embodiment of the present invention. In this method, an image to be printed is rasterized in view of a high resolution, so as to generate a data bitmap. Then, the data bitmap is split according to a ratio of the high resolution to a low resolution so as to generate new data bitmaps. The new data bitmaps are sent to a printer with the low resolution and an image with the high resolution can be printed.

Figure 1:
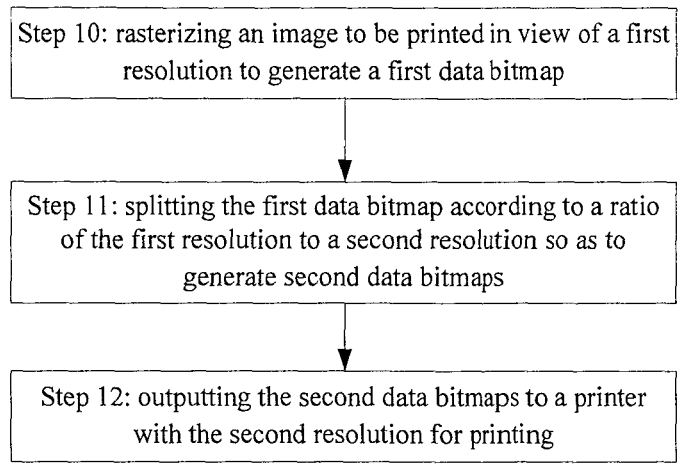
FIG. 1 is a flowchart showing a method according to a embodiment of the invention.

Referring to FIG. 1, the method for printing an image according to the present invention comprises the following steps. At step 10, an image to be printed is rasterized in view of a first resolution so that a first data bitmap is generated. At step 11, the first data bitmap is split according to a ratio of the first resolution to a second resolution so that second data bitmaps are generated. At step 12, the second data bitmaps are sent to a printer with the second resolution for printing.

Hereinafter, four embodiments of the method for printing an image according to the present invention will be described in details.

Embodiment 1

In this embodiment, a transverse resolution of the image to be printed is improved from LH to HH, wherein LH is the transverse resolution of the printer, and HH is h times of LH.

Furthermore, h=(1/dh)/LH, wherein dh is a transverse moving distance of an ink head of the printer and dh=1/HH. According to the embodiment of the present invention, the transverse resolution of the image to be printed is improved from LH to HH. The principle is discussed as below. The transverse resolution LH of the printer means that an interval between two transversely adjacent ink dots is 1/LH in a printing work. Since the transverse moving distance dh of the ink head is 1/h of the interval, when a row of data is printed, the transverse resolution may be improved from LH to HH by printing the $[(n-1)*h+1]^{th}$ pixel at the planned position for the $n^{th}$ pixel by splitting the data bitmap, namely, inserting h−1 pixels uniformly between each two adjacent pixels.

Figure 2A:
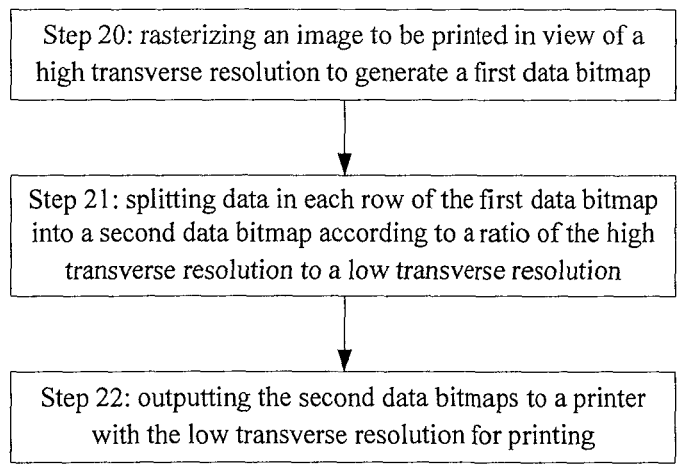
FIG. 2A is a flowchart showing a method according to a first embodiment of the invention.

As shown in FIG. 2A, the method according to this embodiment comprises the following steps.

At step 20, the image to be printed is rasterized in view of a high transverse resolution (HH) so that a first data bitmap is generated.

At step 21, each row of data in the first data bitmap is split into a second data bitmap according to a ratio of the high transverse resolution (HH) to a low transverse resolution (LH).

In particular, a row in the first data bitmap is split by extracting pixels h times. Pixels extracted in each extraction form a sub-row and a second data bitmap is formed by the sub-rows. In the extraction, one pixel is extracted from every h pixels in a row. Thus, the number of the sub-rows in the second data bitmap is the resolution ratio h. The number of pixels in each sub-row is a quotient obtained by dividing the number of the pixels in the row by the resolution ratio h.

For demonstration, assuming that the row data before the splitting is {a1, a2, a3, . . . , aI}, i.e., the number of the pixels in the row is I, the number of the sub-rows after splitting the row is h, and the number of the pixels in each sub-row is I/h.

It is noted that I has to be a multiple of h. That is, the number of the pixels in a row before the splitting is required to be an integral multiple of the resolution ratio. If I is not an integral multiple of h, blank pixels may be added to the end of the row before the splitting so that the number of the pixels in the row becomes an integral multiple of h. In particular, the blank pixels may be added when the rasterization of the image or the splitting of the row is performed.

At step 22, the second data bitmaps obtained after the splitting are output to a printer with the low transverse resolution (LH) row by row for printing.

In particular, for printing a row of data in the first data bitmap, the sub-rows in the second data bitmap formed by splitting the row of data are output to the printer sequentially for printing. Before each sub-row is printed, the ink head of the printer is driven to move a first distance from an origin of the row to the right. Then, the sub-row is printed. Each of the sub-rows is processed like this until all the sub-rows in the second data bitmap are printed. After all the sub-rows are printed, the ink head of the printer returns to the origin and moves down a row spacing of the first data bitmap to the next row so as to print the next row of data until all the rows in the first data bitmap are printed.

Herein, the first distance is a product of the row number of the sub-row minus 1 and the transverse moving distance dh of the ink head. For example, when the first sub-row in a second data bitmap is to be printed, the first distance by which the ink head of the printer is driven to move to the right is (1−1)*dh=0; and when the second sub-row in the second data bitmap is to be printed, the first distance by which the ink head of the printer is driven to move to the right is (2−1)*dh=dh.

Figure 2B:
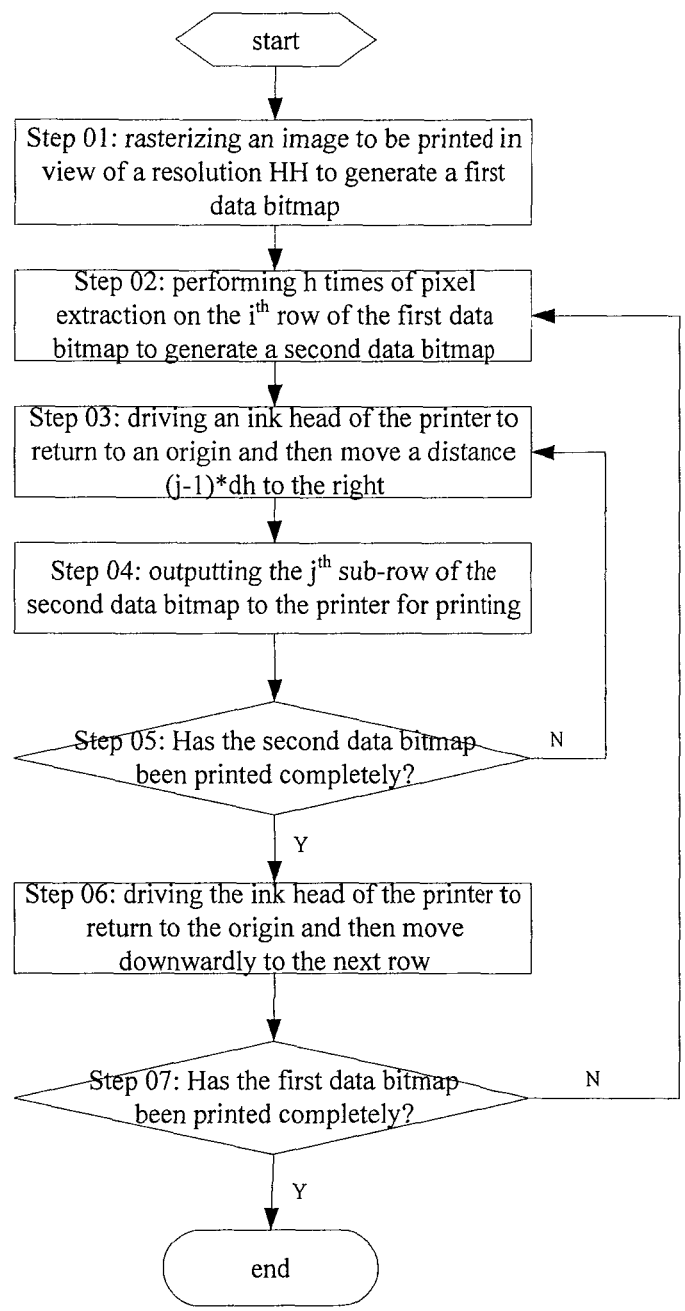
FIG. 2B is a schematic view showing a process of printing an image according to the first embodiment of the invention.

As shown in FIG. 2B, a flowchart of a method for printing an image completely according to the embodiment comprising the following steps.

At step S01, the image to be printed is rasterized in view of a resolution HH so that a first data bitmap is generated.

At step S02, pixels in the $i^{th}$ row in the first data bitmap are extracted h times. Pixels extracted in each time form a sub-row. h sub-rows are formed after h times of pixel extraction. The h sub-rows form a second data bitmap. Each of the sub-rows comprises I/h pixels. In this step, i is an integer in a range from 1 to Q and equal to 1 initially, and Q is the number of the rows in the first data bitmap.

At step S03, the ink head of the printer is driven to return to the origin and then move a distance of (j−1)*dh to the right, wherein j is an integer in a range from 1 to h and equal to 1 initially.

At step S04, the $j^{th}$ sub-row of the second data bitmap is output to the printer for printing.

The sub-rows may be output sequentially. Alternatively, the sub-rows may also be output randomly as long as none of them is output repeatedly.

At step S05, it is determined whether all the sub-rows in the second data bitmap are printed, i.e., whether j is equal to h. If it is the case, the process goes to step S06; otherwise, j is increased by 1 and the process returns to step S03 for printing other sub-rows.

At step S06, the ink head of the printer is driven to return to the origin and move downwardly to the next row.

At step S07, it is determined whether the first data bitmap is printed completely, i.e., whether i is equal to Q. If it is the case, the printing of the image is completed and the process is ended; otherwise, i is increased by 1 and the process returns to step S02.

Embodiment 2

In this embodiment, a longitudinal resolution of the image to be printed is improved from LV to HV, wherein LV is the longitudinal resolution of the printer, and HV is v times of LV. Furthermore, v=(1/dv)/LV, wherein dv is a longitudinal moving distance of an ink head of the printer and dv=1/HV. According to the embodiment of the present invention, the longitudinal resolution of the image to be printed is improved from LV to HV. The principle is discussed as below. Assuming N nozzles are provided in the ink head of the printer, N rows of data will be printed simultaneously in one scanning performed by the printer, wherein an interval between each two adjacent rows is 1/LV. Since the longitudinal moving distance dv of the ink head is 1/v of the interval, the longitudinal resolution may be improved from LV to HV by printing the $[(m-1)*v+1]^{th}$ row in the planned position for the $m^{th}$ row by splitting the data bitmap, namely, inserting v−1 rows uniformly between each two adjacent rows.

Figure 3A:
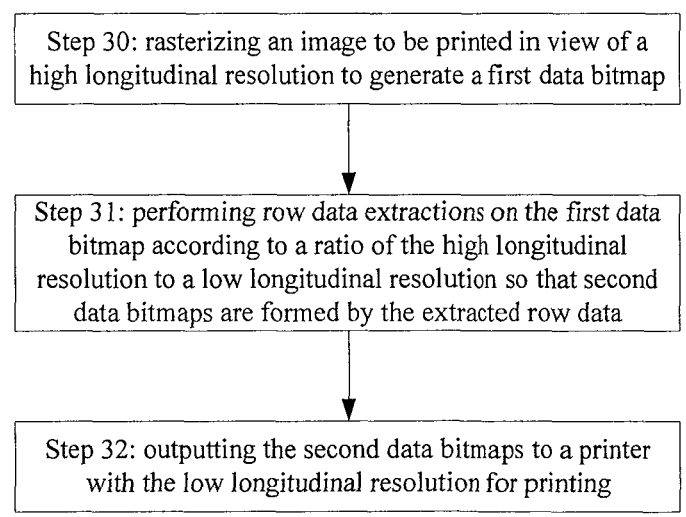
FIG. 3A is a flowchart showing a method according to a second embodiment of the invention.

As shown in FIG. 3A, the method according to this embodiment comprises the following steps.

At step 30, the image to be printed is rasterized in view of a high longitudinal resolution (HV) so that a first data bitmap is generated.

At step 31, row data in the first data bitmap are extracted according to a ratio of the high longitudinal resolution (HV) to a low longitudinal resolution (LV). The extracted row data form second data bitmaps.

In particular, for every N*v rows of data in the first data bitmap, v times of data extraction are performed. Row data extracted in each time form a second data bitmap. In the extraction, one row is extracted from every v rows in the N*v rows. Thus, N rows are extracted one time. Thus, the second data bitmap is an N-row data bitmap.

At step 32, the second data bitmaps are output to a printer with the low longitudinal resolution (LV) for printing.

The second data bitmaps formed by v times of extraction in the step 31 are output to the printer for printing. Once a second data bitmap is printed completely, the ink head of the printer is driven to move downwardly a distance dv so as to print the next second data bitmap. Each of the second data bitmaps is processed like this until all the v second data bitmaps are printed.

After all the v second data bitmaps are printed, the ink head of the printer are driven to move a second distance downwardly so as to perform the extraction and printing of the next N*v rows in the first data bitmap until the first data bitmap are printed completely.

The second distance is a product of the number of the nozzles on the ink head, the resolution ratio and the longitudinal moving distance of the ink head, i.e., N*v*dv.

Figure 3B:
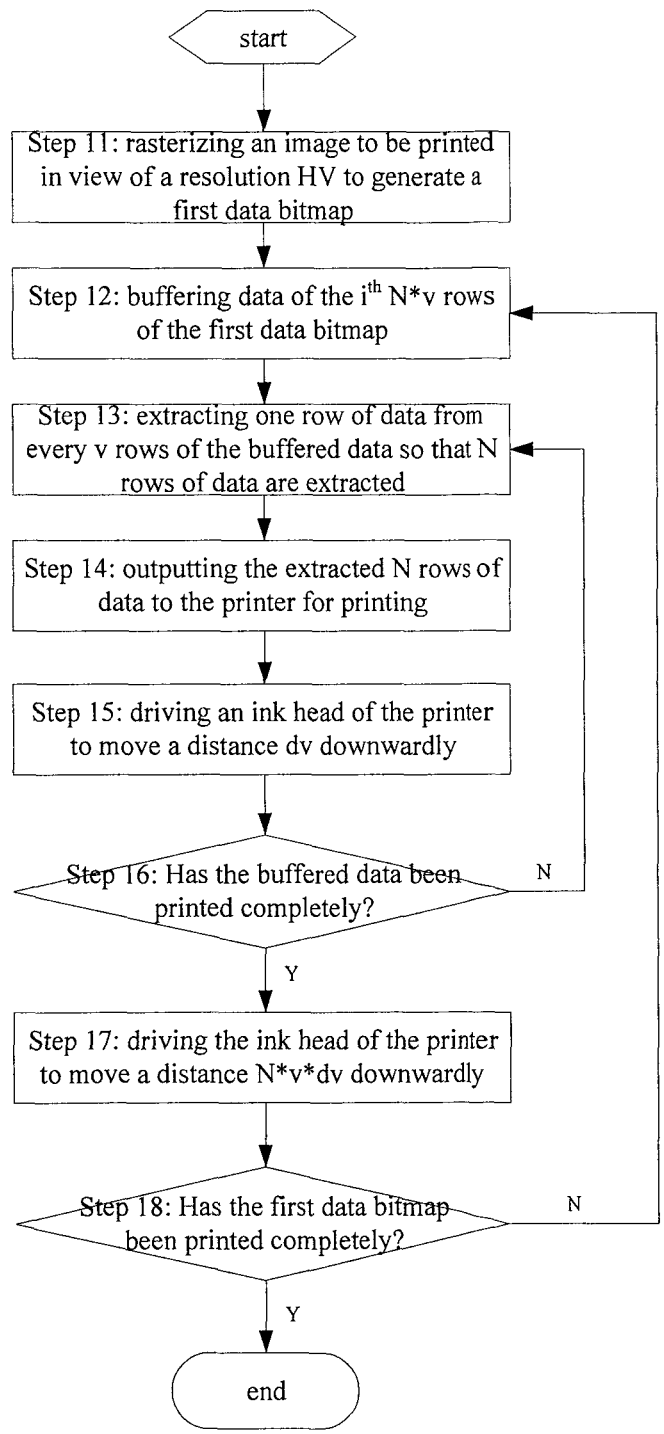
FIG. 3B is a schematic view showing a process of printing an image according to the second embodiment of the invention.

As shown in FIG. 3B, a flowchart of a method for printing an image completely according to the embodiment comprising the following steps.

At step S11, the image to be printed is rasterized in view of a resolution HV so that a first data bitmap is generated.

At step S12, data in the $i^{th}$ N*v rows in the first data bitmap is buffered, wherein i is an integer in a range from 1 to Q and equal to 1 initially. Q is equal to a quotient obtained by dividing the number of the rows of the first data bitmap by N*v if the generated remainder is 0; otherwise, Q is equal to the quotient plus 1.

At step S13, one row is extracted from every v rows in the buffered data so that N rows are extracted.

The extraction has to be performed according to a sequence of the rows. For example, the first row of every v rows is extracted firstly. Then, the second row of every v rows is extracted secondly. Similarly, other rows are extracted sequentially until the $v^{th}$ row of every v rows is extracted finally.

At step S14, the extracted N rows of data are output to the printer for printing.

At step S15, the ink head of the printer is driven to move a distance dv downwardly.

At step S16, it is determined whether all the buffered data is printed, i.e., whether v times of data extraction are performed. If it is the case, the process goes to step S17; otherwise, the process returns to step S13 for performing the extraction and printing.

At step S17, the ink head of the printer is driven to move a distance N*v*dv downwardly.

At step S18, it is determined whether the first data bitmap is printed completely, i.e., whether i is equal to Q. If it is the case, the printing of the image is completed and the process is ended; otherwise, i is increased by 1 and the process returns to step S12.

It is noted that, since N*v rows are buffered for processing each time, if the number of the rows of the first data bitmap is not an integral multiple of N*v, blank rows are required to be added at the end of the first data bitmap so that the number of the rows of the first data bitmap becomes an integral multiple of N*v.

Embodiment 3

In this embodiment, a transverse resolution of the image to be printed is improved from LH to HH, and at the same time, a longitudinal resolution of the image to be printed is improved from LV to HV, wherein LH is the transverse resolution of the printer, HH is h times of LH, LV is the longitudinal resolution of the printer, and HV is v times of LV. Furthermore, h=(1/dh)/LH, wherein dh is a transverse moving distance of an ink head of the printer and dh=1/HH. In addition, v=(1/dv)/LV, wherein dv is a longitudinal moving distance of the ink head of the printer and dv=1/HV. N is the number of the nozzles provided in the ink head of the printer.

Figure 4A:
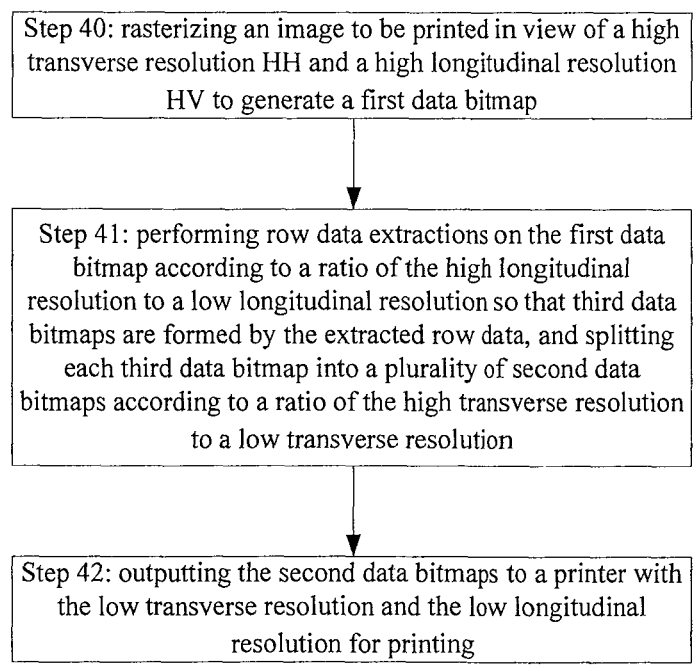
FIG. 4A is a flowchart showing a method according to a third embodiment of the invention.

As shown in FIG. 4A, the method according to this embodiment comprises the following steps.

At step 40, the image to be printed is rasterized in view of a high transverse resolution HH and a high longitudinal resolution HV so as to generate a first data bitmap.

At step 41, row data in the first data bitmap are extracted according to a ratio of the high longitudinal resolution to a low longitudinal resolution. The extracted row data form a third data bitmap. Then, the third data bitmap is split into a plurality of second data bitmaps according to a ratio of the high transverse resolution to a low transverse resolution.

In particular, for every N*v rows of data in the first data bitmap, v times of data extraction are performed. Row data extracted in each time form a third data bitmap. In the extraction, one row is extracted from every v rows in the N*v rows.

Then, h times of data extraction are performed on the third data bitmap. A second data bitmap is formed by the sub-rows generated by each time of extraction. In particular, a plurality of pixels are extracted from a row of the third data bitmap so as to form a sub-row. In each extraction, one pixel is extracted from every h pixels in a row.

At step 42, the second data bitmaps are output to a printer with the low transverse resolution (LH) and the low longitudinal resolution (LV).

In particular, the ink head of the printer is driven to move a first distance from an origin to the right and a second data bitmap is output to the printer for printing. N rows are scanned and printed synchronously. When the printing of the second data bitmap is completed, the ink head of the printer is driven to move the first distance from the origin to the right and a next second data bitmap is printed until h second data bitmaps (i.e., a third data bitmap) are printed. In this time, the ink head of the printer is driven to return to the origin and move a distance dv downwardly. A next third data bitmap is printed until v third data bitmaps extracted from the N*v rows are all printed. When the printing of the v third data bitmaps is completed, the ink head of the printer is driven to move a second distance downwardly. Then, a next N*v rows is printed until the printing of the first data bitmap is completed.

The first distance is a product of the bitmap number of the current second data bitmap minus 1 and the transverse moving distance dh of the ink head. For example, when the first second data bitmap of the third data bitmap is to be printed, the first distance by which the ink head of the printer is driven to move to the right is (1−1)*dh=0; and when the second data bitmap is to be printed, the first distance by which the ink head of the printer is driven to move to the right is (2−1)*dh=dh. The second distance is a product of the number of the nozzles in the ink head, a ratio of the high longitudinal resolution to the low longitudinal resolution, and the longitudinal moving distance of the ink head, i.e., N*v*dv.

In the above steps 40-42, the number of the rows in the first data bitmap is an integral multiple of N*v, and the number of the pixels in a row of the first data bitmap is an integral multiple of h. However, in practice, the following three situations may be possible. Situation 1: the number of the rows in the first data bitmap is not an integral multiple of N*v, and the number of the pixels in a row of the first data bitmap is not an integral multiple of h. Situation 2: the number of the rows in the first data bitmap is not an integral multiple of N*v, but the number of the pixels in a row of the first data bitmap is an integral multiple of h. Situation 3: the number of the rows in the first data bitmap is an integral multiple of N*v, but the number of the pixels in a row of the first data bitmap is not an integral multiple of h.

For the above-mentioned Situation 1, the following process is performed.

At first, an image to be printed is rasterized in view of a high transverse resolution HH and a high longitudinal resolution HV so as to generate a first data bitmap. Then, blank rows are added to the first data bitmap so that the number of the rows in the first data bitmap becomes an integral multiple of N*v; and blank pixels are added to each row of the first data bitmap so that the number of the pixels in each row of the first data bitmap becomes an integral multiple of h. Next, row data in the first data bitmap are extracted according to a ratio of the high longitudinal resolution to the low longitudinal resolution. The extracted row data forms a third data bitmap. The third data bitmap is split into a plurality of second data bitmaps according to a ratio of the high transverse resolution to the low transverse resolution as discussed in the step 41. Finally, the second data bitmaps are output to a printer with the low transverse resolution (LH) and the low longitudinal resolution (LV) for printing as discussed in the step 42.

For the above-mentioned Situation 2, the following process is performed.

At first, an image to be printed is rasterized in view of a high transverse resolution HH and a high longitudinal resolution HV so as to generate a first data bitmap. Then, blank rows are added to the first data bitmap so that the number of the rows in the first data bitmap becomes an integral multiple of N*v. Next, row data in the first data bitmap are extracted according to a ratio of the high longitudinal resolution to the low longitudinal resolution. The extracted row data forms a third data bitmap. The third data bitmap is split into a plurality of second data bitmaps according to a ratio of the high transverse resolution to the low transverse resolution as discussed in the step 41. Finally, the second data bitmaps are output to a printer with the low transverse resolution (LH) and the low longitudinal resolution (LV) for printing as discussed in the step 42.

For the above-mentioned Situation 3, the following process is performed.

At first, an image to be printed is rasterized in view of a high transverse resolution HH and a high longitudinal resolution HV so as to generate a first data bitmap. Then, blank pixels are added to each row of the first data bitmap so that the number of the pixels in each row of the first data bitmap becomes an integral multiple of h. Next, row data in the first data bitmap are extracted according to a ratio of the high longitudinal resolution to the low longitudinal resolution. The extracted row data forms a third data bitmap. The third data bitmap is split into a plurality of second data bitmaps according to a ratio of the high transverse resolution to the low transverse resolution as discussed in the step 41. Finally, the second data bitmaps are output to a printer with the low transverse resolution (LH) and the low longitudinal resolution (LV) for printing as discussed in the step 42.

Figure 4B:
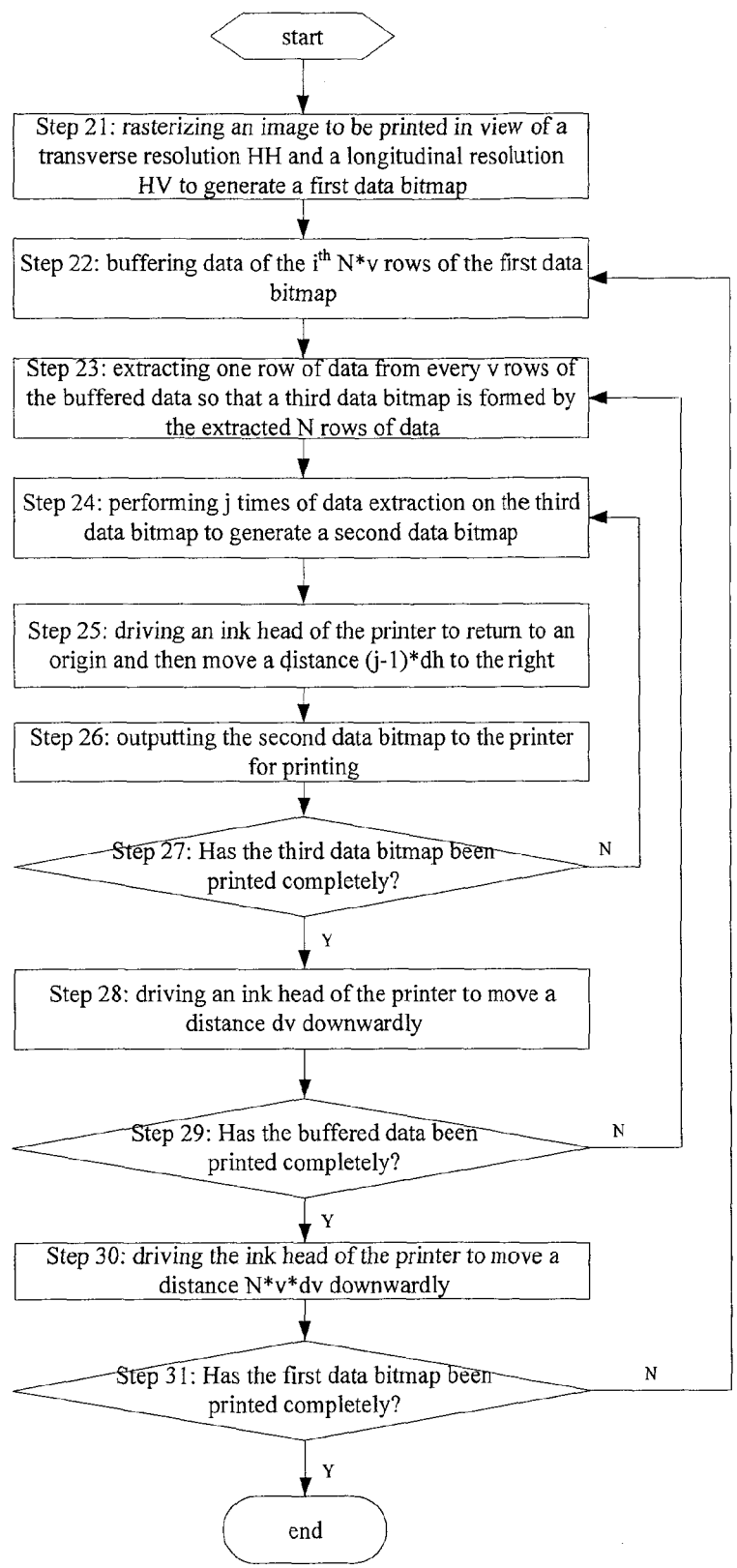
FIG. 4B is a schematic view showing a process of printing an image according to the third embodiment of the invention.

As shown in FIG. 4B, a flowchart of the method for printing an image according to the embodiment comprises the following steps.

At step S21, the image to be printed is rasterized in view of a transverse resolution HH and a longitudinal resolution HV so that a first data bitmap is generated.

At step S22, data of the $i^{th}$ N*v rows in the first data bitmap is buffered, wherein i is an integer in a range from 1 to Q and equal to 1 initially. Q is equal to a quotient obtained by dividing the number of the rows of the first data bitmap by N*v if the generated remainder is 0; otherwise, Q is the quotient plus 1.

At step S23, one row is extracted from every v rows in the buffered data so that N rows are extracted. The extracted N rows form a third data bitmap.

The extraction has to be performed according to a sequence of the rows. For example, the first row of every v rows is extracted firstly. Then, the second row of every v rows is extracted secondly. Similarly, other rows are extracted sequentially until the $v^{th}$ row of every v rows is extracted finally.

At step S24, data in the third data bitmap are extracted j times. In particular, I/h pixels are extracted from each row of the third data bitmap to form a sub-row. Since the number of the rows of the third data bitmap is N, N sub-rows are formed. The N sub-rows form a second data bitmap. In this step, j is an integer in a range from 1 to h and equal to 1 initially.

In particular, one pixel is extracted from every h pixels in a row when pixels are extracted from a row of the third data bitmap. I is the number of the pixels in each row of the first data bitmap. Thus, I/h pixels are extracted in each time of extraction.

At step S25, the ink head of the printer is driven to move a distance (j−1)*dh from an origin to the right.

At step S26, the second data bitmap is output to the printer for printing.

The extraction and printing may be performed sequentially. For example, the first pixel in every h pixels is extracted firstly and the ink head of the printer moves a distance (1−1)*dh to the right (namely, without any moving) to print the extracted pixels. Then, the second pixel in every h pixels is extracted and the ink head of the printer moves a distance (2−1)*dh to the right to print the extracted pixels. Other pixels in the second data bitmap are processed similarly until the $h^{th}$ pixel in every h pixels is extracted in the $h^{th}$ time of extraction and the ink head of the printer moves a distance (h−1)*dh to the right to print the extracted pixels. Alternatively, the extraction and printing may be performed in a random sequence as long as none of the pixels is extracted repeatedly and the moved distances are correct.

At step S27, it is determined whether the printing of the third data bitmap is completed, i.e., whether j is equal to h. If it is the case, the process goes to step S28; otherwise, j is increased by 1 and the process returns to step S24 for performing the extraction and printing.

At step S28, the ink head of the printer is driven to move a distance dv downwardly.

At step S29, it is determined whether all the buffered data is printed completely. If it is the case, the process goes to step S30; otherwise, the process returns to step S23 for performing the extraction and printing.

At step S30, the ink head of the printer is driven to move a distance N*v*dv downwardly.

At step S31, it is determined whether the first data bitmap is printed completely, i.e., whether i is equal to Q. If it is the case, the printing of the image is completed and the process is ended; otherwise, i is increased by 1 and the process returns to step S22.

Embodiment 4

In this embodiment, a transverse resolution of the image to be printed is improved from LH to HH, and at the same time, a longitudinal resolution of the image to be printed is improved from LV to HV, wherein LH is the transverse resolution of the printer, HH is h times of LH, LV is the longitudinal resolution of the printer, and HV is v times of LV. Furthermore, h=(1/dh)/LH, wherein dh is a transverse moving distance of an ink head of the printer and dh=1/HH. In addition, v=(1/dv)/LV, wherein dv is a longitudinal moving distance of the ink head of the printer and dv=1/HV. N is the number of the nozzles provided in the ink head of the printer.

Figure 5A:
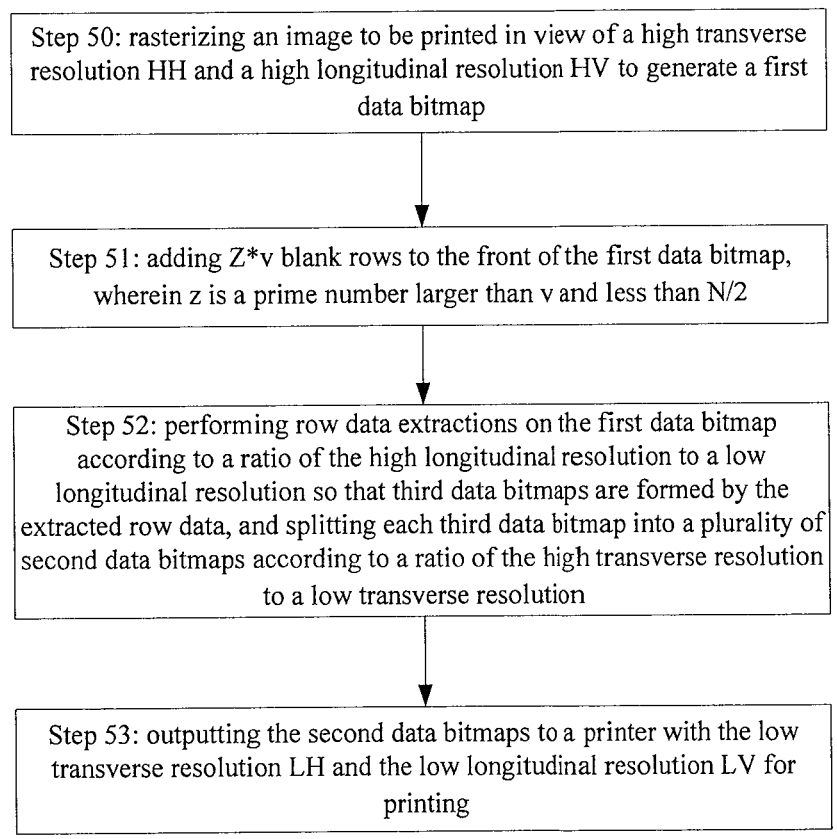
FIG. 5A is a flowchart showing a method according to a fourth embodiment of the invention.

As shown in FIG. 5A, the method according to this embodiment comprises the following steps.

At step 50, the image to be printed is rasterized in view of a high transverse resolution HH and a high longitudinal resolution HV so as to generate a first data bitmap.

At step 51, z*v blank rows are added to the front of the first data bitmap, wherein z is a prime number larger than v and less than N/2. A larger z is, a larger speed of printing is.

At step 52, row data in the first data bitmap are extracted according to a ratio of the high longitudinal resolution to a low longitudinal resolution. The extracted row data form a third data bitmap. Then, the third data bitmap is split into a plurality of second data bitmaps according to a ratio of the high transverse resolution to a low transverse resolution.

In particular, for every N*v rows of data in the first data bitmap, v times of row data extraction are performed. Row data extracted in each time of extraction form a third data bitmap. In the extraction, one row is extracted from every v rows in the N*v rows.

Then, h times of column data extraction are performed on the third data bitmap. Sub-rows generated by each time of extraction form a second data bitmap. In particular, a plurality of pixels are extracted from a row of the third data bitmap to form a sub-row. In each extraction, one pixel is extracted from every h pixels in a row.

At step 53, the second data bitmap is output to a printer with the low transverse resolution (LH) and the low longitudinal resolution (LV).

In particular, the ink head of the printer is driven to move a first distance from an origin to the right and a second data bitmap is output to the printer for printing. N rows are scanned and printed synchronously. When the printing of the second data bitmap is completed, the ink head of the printer is driven to return to the origin, move a third distance downwardly and then move the first distance to the right, so as to print a next second data bitmap. Remaining second data bitmaps are processed similarly until the printing of the first data bitmap is completed.

The first distance is a product of j minus 1 and the transverse moving distance dh of the ink head, i.e., (j−1)*dh. The value of j is in a range from 1 to h and equal to 1 initially. After each second data bitmap is printed, j is increased by 1. If an obtained j is larger than h, j is set to 1. The third distance is z*dv.

In the above steps 50-53, the number of the pixels in a row of the first data bitmap is an integral multiple of h. Where the number of the pixels in a row of the first data bitmap is not an integral multiple of h, the following process is performed.

At first, an image to be printed is rasterized in view of a high transverse resolution HH and a high longitudinal resolution HV so as to generate a first data bitmap. Then, z*v blank rows are added to the front of the first data bitmap, and blank pixels are added to each row of the first data bitmap so that the number of the pixels in each row of the first data bitmap becomes an integral multiple of h. Next, row data in the first data bitmap are extracted according to a ratio of the high longitudinal resolution to a low longitudinal resolution. The extracted row data foam a third data bitmap. The third data bitmap is split into a plurality of second data bitmaps according to a ratio of the high transverse resolution to the low transverse resolution as discussed in the step 52. Finally, the second data bitmaps are output to a printer with the low transverse resolution (LH) and the low longitudinal resolution (LV) for printing as discussed in the step 53.

Figure 5B:
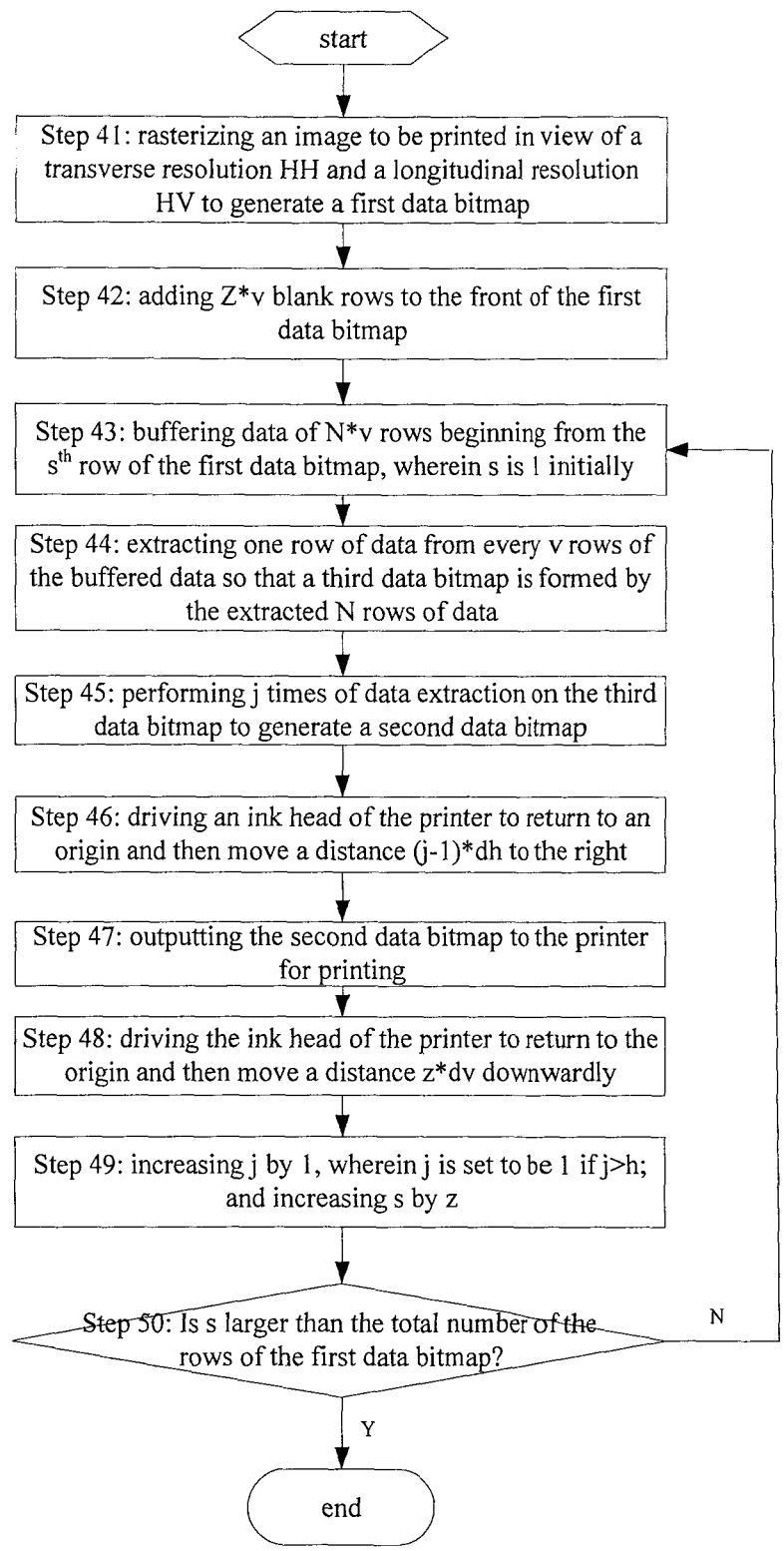
FIG. 5B is a schematic view showing a process of printing an image according to the fourth embodiment of the invention.

As shown in FIG. 5B, a flowchart of the method for printing an image according to the embodiment comprises the following steps.

At step S41, the image to be printed is rasterized in view of a transverse resolution HH and a longitudinal resolution HV so that a first data bitmap is generated.

At step S42, z*v blank rows are added to the front of the first data bitmap.

At step S43, data of N*v rows beginning from the $s^{th}$ row in the first data bitmap are buffered, wherein s is an integer in a range from 1 to the total number of the rows of the first data bitmap and equal to 1 initially. If the result of the total number of the rows of the first data bitmap minus s is less than N*v, some blank rows are added to the end of the first data bitmap so that there are N*v rows beginning from the $s^{th}$ row to be buffered.

At step S44, one row is extracted from every v rows in the buffered data so that N rows are extracted. The extracted N rows form a third data bitmap.

At step S45, data in the third data bitmap are extracted j times. In particular, I/h pixels are extracted from each row of the third data bitmap to form a sub-row. Since the number of the rows of the third data bitmap is N, N sub-rows are formed. The N sub-rows form a second data bitmap. In this step, j is an integer in a range from 1 to h and equal to 1 initially.

In particular, one pixel is extracted from every h pixels in a row when pixels are extracted from a row of the third data bitmap. I is the number of the pixels in each row of the first data bitmap. Thus, I/h pixels are extracted in each time of extraction.

The extraction and printing are performed sequentially.

At step S46, the ink head of the printer is driven to return an origin and then move a distance (j−1)*dh from the origin to the right.

At step S47, the second data bitmap is output to the printer for printing wherein N rows are output in a time.

At step S48, the ink head of the printer is driven to return to the origin and then move a distance z*dv downwardly.

At step S49, j is increased by 1, wherein j is set to be 1 if it is increased to be larger than h. Meanwhile, s is increased by v, which means v rows in the first data bitmap have been printed.

At step S50, it is determined whether the printing of the first data bitmap is completed, i.e., whether s is larger than the total number of the rows in the first data bitmap. If it is the case, the printing of the image is completed and the process is ended; otherwise, the process returns to step S43 for performing the data extraction and printing.

In the present invention, to improve the printing efficiency, it is not necessary to perform the splitting and printing after the whole image to be printed is rasterized. Instead, the rasteration, splitting and printing may be performed simultaneously. In this case, an ample rows of data in the data bitmap has to be buffered so that the printing can be performed continuously, thus speeding up the whole printing process.

In the embodiments, the image to be printed may be a multi-color image. A plurality of first data bitmaps are generated after the multi-color image is rasterized. Each color corresponds to a first data bitmap. In this case, a color printer is adapted. Alternatively, the image to be printed may be a single-color image. One first data bitmap is generated after the single-color image is rasterized. In this case, a monochrome printer is adapted.

Figure 6A:
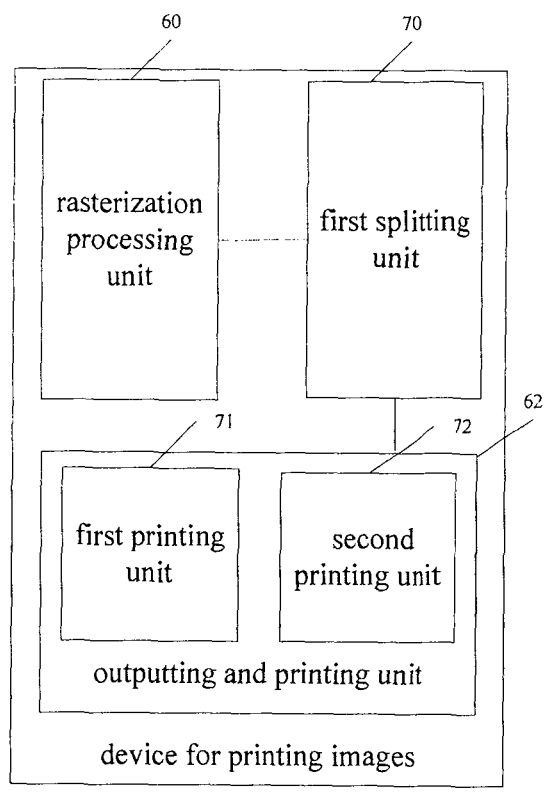
FIG. 6A is a schematic view showing the structure of a device according to an embodiment of the invention.
Figure 6B:
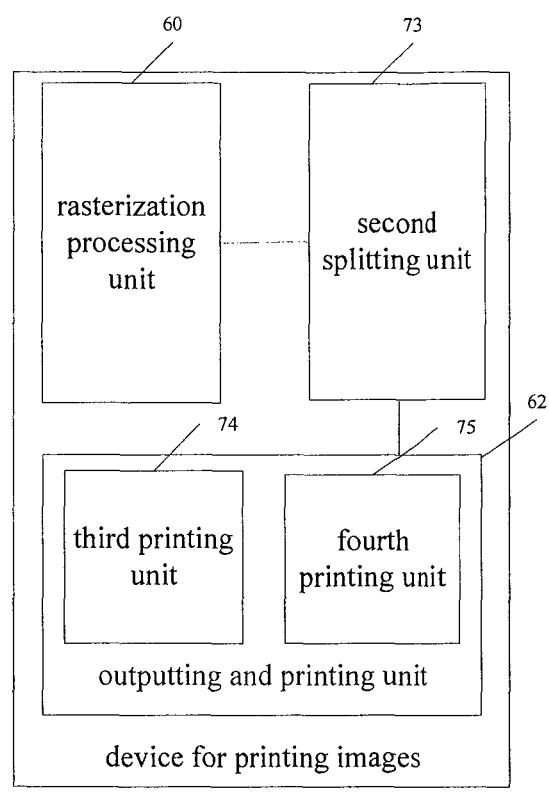
FIG. 6B is a schematic view showing the structure of a device according to another embodiment of the invention.
Figure 6C:
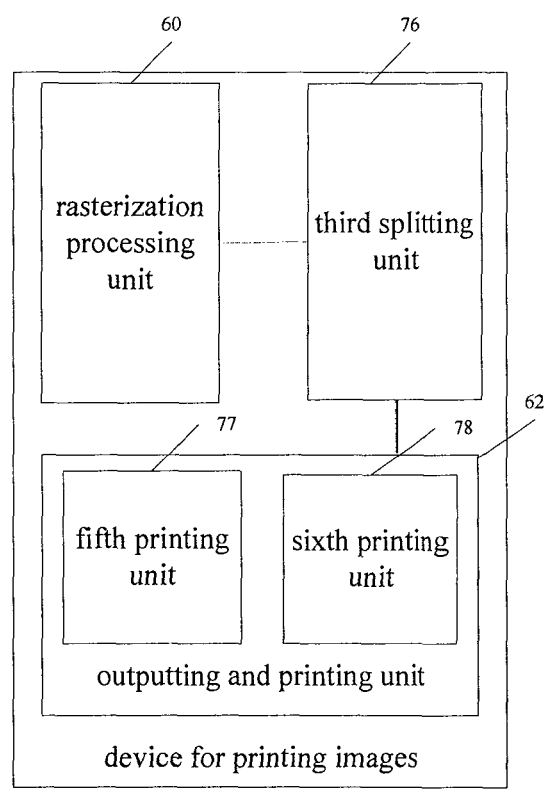
FIG. 6C is a schematic view showing the structure of a device according to still another embodiment of the invention.

FIGS. 6A-6C show devices according to the first, second and third embodiments of the present invention, respectively. As shown in FIGS. 6A-6C, a device for printing an image comprises:

a rasterization processing unit 60 for rasterizing an image to be printed in view of a first resolution so as to generate a first data bitmap;

a bitmap splitting unit for splitting the first data bitmap according to a ratio of the first resolution to a second resolution so as to generate second data bitmaps; and an outputting and printing unit 62 for outputting the second data bitmaps to a printer with the second resolution for printing.

Reference to FIG. 6A, the bitmap splitting unit according to the first embodiment is a first splitting unit 70 for splitting each row in the first data bitmap into a second data bitmap according to the ratio of a first transverse resolution to a second transverse resolution, in the case that the first resolution is the first transverse resolution, the second resolution is the second transverse resolution, and the first transverse resolution is an integer multiple of the second transverse resolution.

The first splitting unit 70 comprises:

a first extracting unit for extracting pixels from a row in the first data bitmap h times, wherein the pixels extracted in each time form a sub-row, and in each extraction, one pixel is extracted from every h pixels in a row; and a first constructing unit for constructing second data bitmaps by using each sub-row.

The outputting and printing unit 62 comprises a first printing unit 71 for outputting sub-rows of the second data bitmap to the printer row by row for printing, driving an ink head of the printer to move a first distance to the right from an origin before each sub-row is printed, and driving the ink head of the printer to return to the origin and then move to the next row after each sub-row is printed completely, wherein, the first distance is the product of the preset dh and the row number of a sub-row minus 1, h is the ratio of the first transverse resolution to the second transverse resolution, and dh is a preset transverse moving distance of the ink head and is the reciprocal of the first transverse resolution.

The first splitting unit 70 comprises:

a first supplementing unit for adding blank pixels to the end of a row where the number of the pixels in the row is not an integer multiple of the ratio of the first transverse resolution to the second transverse resolution, such that the number of the pixels in the row supplemented with the blank pixels becomes an integer multiple of the ratio;

a second extracting unit for extracting pixels from a row of the first data bitmap h times, wherein the pixels extracted in each time form a sub-row, and in each extraction, one pixel is extracted from every h pixels in a row; and a second constructing unit for constructing second data bitmaps by using each sub-row.

The outputting and printing unit 62 comprises a second printing unit 72 for for outputting sub-rows of the second data bitmap to the printer row by row for printing, driving an ink head of the printer to move a first distance to the right from an origin before each sub-row is printed, and driving the ink head of the printer to return to the origin and then move to the next row after each sub-row is printed completely, wherein, the first distance is the product of the preset dh and the row number of a sub-row minus 1, h is the ratio of the first transverse resolution to the second transverse resolution, and dh is a preset transverse moving distance of the ink head and is the reciprocal of the first transverse resolution.

Reference to FIG. 6B, the bitmap splitting unit according to the second embodiment is a second splitting unit 73 for extracting rows of data from the first data bitmap according to a ratio of a first longitudinal resolution to a second longitudinal resolution so as to form second data bitmaps with the extracted rows of data, in the case that, the first resolution is the first longitudinal resolution, the second resolution is the second longitudinal resolution, and the first longitudinal resolution is an integer multiple of the second longitudinal resolution.

The second splitting unit 73 comprises:

a third extracting unit for extracting data from every $N*v$ rows in the first data bitmap v times, wherein, in each extraction, one row is extracted from every v rows in the $N*v$ rows, v is the ratio of the first longitudinal resolution to the second longitudinal resolution, and N is the number of the nozzles in the ink head of the printer; and a third constructing unit for forming a second data bitmap by the rows obtained in each extraction.

The outputting and printing unit 62 comprises a third printing unit 74 for outputting the second data bitmap consisting of data extracted by v times to the printer for printing, driving the ink head of the printer to move a preset distance dv downwards after each second data bitmap is printed completely, and driving the ink head of the printer to move a second distance downwards after the second data bitmap consisting of data extracted by v times is printed completely, wherein the second distance is equal to $N*v*dv$, dv is a preset longitudinal moving distance of the ink head and is the reciprocal of the first longitudinal resolution.

The second splitting unit 73 comprises:

a second supplementing unit for adding blank rows to the end of the first data bitmap where the number of the rows in the first data bitmap is not an integer multiple of $N*v$, such that the number of the rows in the first data bitmap supplemented with blank rows becomes an integer multiple of $N*v$;

a fourth extracting unit for extracting data from every $N*v$ rows in the first data bitmap v times, wherein in each extraction, one row is extracted from every v rows in the $N*v$ rows, v is the ratio of the first longitudinal resolution to the second longitudinal resolution, and N is the number of the nozzles in the ink head of the printer; and a fourth constructing unit for forming a second data bitmap by the rows obtained in each extraction.

The outputting and printing unit 62 comprises a fourth printing unit 75 for outputting the second data bitmap consisting of data extracted by v times to the printer for printing, driving the ink head of the printer to move a preset distance dv downwards after each second data bitmap is printed completely, and driving the ink head of the printer to move a second distance downwards after the second data bitmap consisting of data extracted by v times is printed completely, wherein the second distance is equal to $N*v*dv$, and dv is a preset longitudinal moving distance of the ink head and is the reciprocal of the first longitudinal resolution.

Reference to FIG. 6C, the bitmap splitting unit according to the third embodiment is a third splitting unit 76 for extracting row data from a first data bitmap according to the ratio of a first longitudinal resolution to a second longitudinal resolution so as to form a third data bitmap by the extracted rows, and splitting the third data bitmap into a plurality of second data bitmaps according to the ratio of a first transverse resolution to a second transverse resolution, in the case that, the first resolutions include the first transverse resolution and the first longitudinal resolution, the second resolutions include the second transverse resolution and the second longitudinal resolution, the first transverse resolution is an integer multiple of the second transverse resolution, and the first longitudinal resolution is an integer multiple of the second longitudinal resolution.

The third splitting unit 76 comprises:

a fifth extracting unit for extracting data from every N*v rows in the first data bitmap v times, wherein in each extraction, one row is extracted from every v rows in the N*v rows, v is the ratio of the first longitudinal resolution to the second longitudinal resolution, and N is the number of the nozzles in the ink head of the printer;

a fifth constructing unit for forming the third data bitmap by the rows obtained in each extraction;

a sixth extracting unit for extracting data from the third data bitmap h times, wherein in each extraction, a plurality of pixels are extracted from every row of the third data bitmap and form a sub-row, one pixel is extracted from every h pixels in the row, and h is the ratio of the first transverse resolution to the second transverse resolution; and a sixth constructing unit for forming a second data bitmap by the sub-rows obtained in each extraction.

The outputting and printing unit 62 comprises a fifth printing unit 77 for outputting the second data bitmaps split from the third data bitmap to the printer one by one for printing, wherein N rows are printed for one time, driving the ink head of the printer to move a first distance to the right from the origin of the current row before each second data bitmap is printed, driving the ink head of the printer to return to the origin and move a distance dv downwards after the third data bitmap is printed completely, and driving the ink head of the printer to move a second distance downwards after v third data bitmaps consisting of data extracted by v times are printed completely, wherein the first distance is equal to the product of dh and the bitmap number of the current second data bitmap minus 1, the second distance is equal to N*v*dv, dh is a preset transverse moving distance of the ink head and is the reciprocal of the first transverse resolution, and dv is a preset longitudinal moving distance of the ink head and is the reciprocal of the first longitudinal resolution.

The third splitting unit 76 further comprises a fourth supplementing unit for adding blank rows to the end of the first data bitmap where the number of the rows in the first data bitmap is not an integer multiple of N*v, such that the number of the rows in the first data bitmap supplemented with blank rows is an integer multiple of N*v; and for adding blank pixels to the end of a row in the first data bitmap if the number of the pixels in the row of the first data bitmap is not an integer multiple of h such that the number of the pixels in the row supplemented with blank pixels is an integer multiple of h.

The third splitting unit 76 comprises:

a third supplementing unit for adding z*v blank rows to the front of the first data bitmap, wherein z is a prime number larger than v and less than N/2, v is the ratio of the first longitudinal resolution to the second longitudinal resolution, and N is the number of the nozzles in the ink head of the printer, a seventh extracting unit for extracting data from every N*v rows in the first data bitmap v times, wherein, in each extraction, one row is extracted from every v rows in the N*v rows;

a seventh constructing unit for forming a third data bitmap by the rows obtained in each extraction;

an eighth extracting unit for extracting data from the third data bitmap h times, wherein in each extraction, a plurality of pixels are extracted from every row in the third data bitmap and form a sub-row, one pixel is extracted from every h pixels in the row, and h is the ratio of the first transverse resolution to the second transverse resolution; and an eighth constructing unit for forming a second data bitmap by the sub-rows obtained in each extraction.

The outputting and printing unit 62 comprises a sixth printing unit 78 for outputting the second data bitmaps to the printer one by one for printing, wherein N rows are printed for one time, driving the ink head of the printer to move a first distance to the right from an origin before each second data bitmap is printed, driving the ink head of the printer to return to the origin and then move a third distance downwards after one second data bitmap is printed completely, wherein, the first distance is equal to the product of dh and the bitmap number of the current second data bitmap minus 1, the third distance is equal to z*dv, dh is a preset transverse moving distance of the ink head and is the reciprocal of the first transverse resolution, and dv is a preset longitudinal moving distance of the ink head and is the reciprocal of the first longitudinal resolution.

The third splitting unit 76 further comprises a fifth supplementing unit for adding blank pixels to a row where the number of the pixels in the row of the first data bitmap is not an integer multiple of h, such that the number of the pixels in the row supplemented with blank pixels is an integer multiple of h.

The image to be printed that is processed by the rasterization processing unit may be a multi-color image. Then, a plurality of first data bitmaps are generated after rasterization. Each color corresponds to a first data bitmap. In this case, a color printer is adapted. Alternatively, the image to be printed may be a single-color image. Then, one first data bitmap is generated after rasterization. In this case, a monochrome printer is adapted.

As discussed above, the present invention has the following effects. When an image is to be printed, the image is rasterized in view of a high resolution so as to generate a first data bitmap. The first data bitmap is then split according to a ratio of the high resolution to a low resolution so as to form second data bitmaps. Finally, the second data bitmaps are outputted to a printer with the low resolution for printing. By utilizing the method of the invention, an image with the high resolution can be printed by a printer with the low resolution without modifying the hardware of the printer, so as to improve the definition of the printed image.

Moreover, according to the present invention, different dh values can be set to obtain different times of the transverse resolution. Similarly, different dv values can be set to obtain different times of the longitudinal resolution. In addition, different dh and dv values can be set to obtain different times of the transverse and longitudinal resolutions.

The present invention is not limited to the descriptions and embodiments mentioned above. Variations and modification made by those skilled in the art according to the disclosure herein should be within the scope of the present invention.

The invention claimed is:

1. A method for printing an image, comprising:
rasterizing an image to be printed in view of a first resolution to generate a first data bitmap;
splitting the first data bitmap according to a ratio of the first resolution to a second resolution to generate a plurality of second data bitmaps; and
outputting the plurality of second data bitmaps to a printer with the second resolution for printing, wherein the first resolution is higher than the second resolution,
wherein
the first resolution is a first transverse resolution, the second resolution is a second transverse resolution, the first transverse resolution is an integral multiple of the second transverse resolution, the integral multiple is h, a transverse moving distance of an ink head of the printer is configured to be dh, dh is the reciprocal of the first transverse resolution, and when the number of pixels included in a row of the first data bitmap is an integral multiple of the ratio of the first transverse resolution to the second transverse resolution, the step of splitting of the first data bitmap comprises:

extracting pixels from a row of the first data bitmap for h times, wherein the pixels extracted in each time form a sub-row, and, in each time of extraction, one pixel is extracted from every h pixels of the row, and forming a second data bitmap by the formed sub-rows, and the step of outputting the second data bitmaps to the printer comprises:

outputting all of the sub-rows forming the second data bitmap to the printer row by row for printing, driving the ink head of the printer to move a first distance rightwards from an origin before each sub-row is printed, wherein the first distance is the product of dh and the row number of the sub-row minus 1, and driving the ink head of the printer to move back to the origin and then to move downwards to a next row after each sub-row is printed completely.

2. The method according to claim 1, wherein when the number of pixels included in a row of the first data bitmap is not an integral multiple of the ratio of the first transverse resolution to the second transverse resolution, the step of splitting of the first data bitmap comprises:

adding blank pixels to the row so that the number of pixels included in the row supplemented with the blank pixels is an integral multiple of the ratio of the first transverse resolution to the second transverse resolution, extracting pixels from a row of the first data bitmap for h times, wherein the pixels extracted in each time form a sub-row, and in each time of extraction, one pixel is extracted from every h pixels of the row, and forming a second data bitmap by the formed sub-rows, and the step of outputting the second data bitmaps to the printer comprises:

outputting all of the sub-rows forming the second data bitmap to the printer row by row for printing, driving the ink head of the printer to move a first distance rightwards from an origin before each sub-row is printed, wherein the first distance is the product of dh and the row number of the sub-row minus 1, and driving the ink head of the printer to move back to the origin and then to move downwards to a next row after each sub-row is printed completely.

3. A method for printing an image, comprising:

rasterizing an image to be printed in view of a first resolution to generate a first data bitmap;

splitting the first data bitmap according to a ratio of the first resolution to a second resolution to generate a plurality of second data bitmaps; and outputting the plurality of second data bitmaps to a printer with the second resolution for printing, wherein the first resolution is higher than the second resolution, wherein the first resolution is a first longitudinal resolution, the second resolution is a second longitudinal resolution, the first longitudinal resolution is an integral multiple of the second longitudinal resolution, the integral multiple is v, the number of nozzles of the ink head of the printer is N, a longitudinal moving distance of the ink head is configured to be dv, dv is the reciprocal of the first longitudinal resolution, and when the number of rows of the first data bitmap is an integral multiple of N*v, the step of splitting the first data bitmap comprises:

extracting data from every N*v rows of the first data bitmap for v times, wherein one row is extracted from every v rows of the N*v rows and rows are extracted from every v rows of the N*v rows sequentially, and forming a second data bitmap by rows extracted in each time, and the step of outputting the second data bitmaps to the printer comprises:

outputting the second data bitmaps formed through the v times of extraction to the printer for printing, driving the ink head of the printer to move downwards a distance of dv after a second data bitmap is printed completely, and driving the ink head of the printer to move downwards a second distance after the v second data bitmaps formed through the v times of extraction are printed completely, wherein the second distance is N*v*dv.

4. The method according to claim 3, wherein when the number of rows of the first data bitmap is not an integral multiple of N*v, the step of splitting the first data bitmap comprises:

adding blank rows to the first data bitmap so that the number of rows of the first data bitmap supplemented with the blank rows is an integral multiple of N*v, extracting data from every N*v rows of the first data bitmap for v times, wherein one row is extracted from every v rows of the N*v rows and rows are extracted from every v rows of the N*v rows sequentially, and forming a second data bitmap by rows extracted in each time, and the step of outputting the second data bitmaps to the printer comprises:

outputting the second data bitmaps formed through the v times of extraction to the printer for printing, driving the ink head of the printer to move downwards a distance of dv after a second data bitmap is printed completely, and driving the ink head of the printer to move downwards a second distance after the v second data bitmaps formed through the v times of extraction are printed completely, wherein the second distance is N*v*dv.

5. A method for printing an image, comprising:

rasterizing an image to be printed in view of a first resolution to generate a first data bitmap;

splitting the first data bitmap according to a ratio of the first resolution to a second resolution to generate a plurality of second data bitmaps; and outputting the plurality of second data bitmaps to a printer with the second resolution for printing, wherein the first resolution is higher than the second resolution, wherein the first resolution comprises the first transverse resolution and the first longitudinal resolution, the second resolution comprises the second transverse resolution and the second longitudinal resolution, the first transverse resolution is an integral multiple of the second transverse resolution, the first longitudinal resolution is an integral multiple of the second longitudinal resolution, and the step of splitting the first data bitmap comprises:

extracting rows from the first data bitmap according to the ratio of the first longitudinal resolution to the second longitudinal resolution so that a plurality of third data bitmaps are formed by the extracted rows, respectively, and splitting each third data bitmap into a plurality of second data bitmaps according to the ratio of the first transverse resolution to the second transverse resolution.

6. The method according to claim 5, wherein the ratio of the first transverse resolution to the second transverse resolution is h, the ratio of the first longitudinal resolution to the second longitudinal resolution is v, the number of nozzles of the ink head of the printer is N, a transverse moving distance of the ink head is configured to be dh, a longitudinal moving distance of the ink head is configured to be dv, dh is the reciprocal of the first transverse resolution, dv is the reciprocal of the first longitudinal resolution, the number of pixels included in the row of the first data bitmap is an integral multiple of the ratio of the first transverse resolution to the second transverse resolution, the number of rows of the first data bitmap is an integral multiple or not an integral multiple of N*v, where the number of rows of the first data bitmap is an integral multiple of N*v, the step of extracting rows from the first data bitmap according to the ratio of the first longitudinal resolution to the second longitudinal resolution so that a plurality of third data bitmaps are formed by the extracted rows, respectively, comprises:

extracting data from every N*v rows of the first data bitmap for v times, wherein one row is extracted from every v rows of the N*v rows and rows are extracted from every v rows of the N*v rows sequentially, and forming a third data bitmap by rows extracted in each time;

the step of splitting each third data bitmap into a plurality of second data bitmaps according to the ratio of the first transverse resolution to the second transverse resolution comprises:

extracting data from each third data bitmap for h times, wherein a plurality of pixels are extracted from each row of the third data bitmap and form a sub-row, and in each time of extraction, one pixel is extracted from every h pixels of a row, and forming a second data bitmap by the formed sub-rows;

the step of outputting the second data bitmaps to a printer with the second resolution for printing comprises:

outputting the second data bitmaps obtained by splitting the third data bitmaps to the printer one by one for printing, wherein N rows are printed synchronously, driving the ink head of the printer to move a first distance rightwards from an origin before each second data bitmap is printed, wherein the first distance is the product of dh and the bitmap number of the current second data bitmap minus 1, driving the ink head of the printer to move back to the origin and then to move downwards for a distance of dv after each third data bitmap is printed completely, and driving the ink head of the printer to move downwards for a second distance after the v third data bitmaps formed through the v times of extraction are printed completely, wherein the second distance is N*v*dv;

wherein if the number of rows of the first data bitmap is not an integral multiple of N*v, blank rows are added to the first data bitmap so that the number of rows of the first data bitmap supplemented with the blank rows is an integral multiple of N*v; and if the number of pixels included in a row of the first data bitmap is not an integral multiple of h, blank pixels are added to the row so that the number of pixels included in the row supplemented with the blank pixels is an integral multiple of h.

7. The method according to claim 5, wherein the ratio of the first transverse resolution to the second transverse resolution is h, the ratio of the first longitudinal resolution to the second longitudinal resolution is v, the number of nozzles of the ink head of the printer is N, a transverse moving distance of the ink head is configured to be dh, a longitudinal moving distance of the ink head is configured to be dv, dh is the reciprocal of the first transverse resolution, dv is the reciprocal of the first longitudinal resolution, the number of pixels included in the row of the first data bitmap is an integral multiple or not an integral multiple of the ratio h of the first transverse resolution to the second transverse resolution, where the number of pixels included in the row of the first data bitmap is an integral multiple of the ratio h of the first transverse resolution to the second transverse resolution, before the step of splitting the first data bitmap according to a ratio of the first resolution to a second resolution, the method further comprises:

adding z*v blank rows to the front of the first data bitmap, wherein z is a prime number larger than v and less than N/2;

the step of extracting rows from the first data bitmap according to the ratio of the first longitudinal resolution to the second longitudinal resolution so that a plurality of third data bitmaps are formed by the extracted rows, respectively, comprises:

extracting data from every N*v rows of the first data bitmap for v times, wherein one row is extracted from every v rows of the N*v rows and rows are extracted from every v rows of the N*v rows sequentially, and forming a third data bitmap by rows extracted in each time;

the step of splitting each third data bitmap into a plurality of second data bitmaps according to the ratio of the first transverse resolution to the second transverse resolution comprises:

extracting data from each third data bitmap for h times, wherein a plurality of pixels are extracted from each row of the third data bitmap and form a sub-row, and, in each time of extraction, one pixel is extracted from every h pixels of a row, and forming a second data bitmap by the formed sub-rows;

the step of outputting the second data bitmaps to a printer with the second resolution for printing comprises:

outputting the second data bitmaps to the printer one by one for printing, wherein N rows are printed synchronously, driving the ink head of the printer to move a first distance rightwards from an origin before each second data bitmap is printed, wherein the first distance is the product of dh and the bitmap number of the current second data bitmap minus 1, and driving the ink head of the printer to move back to the origin and then to move downwards for a third distance, wherein the third distance is z*dv;

wherein if the number of pixels included in a row of the first data bitmap is not an integral multiple of h, blank pixels are added to the row so that the number of pixels included in the row supplemented with the blank pixels is an integral multiple of h, rows are extracted from every v rows of the N*v rows sequentially, and the second data bitmaps are output to the printer sequentially.

8. A device for printing images, comprising:
a rasterization processing unit for rasterizing an image to be printed in view of a first resolution to generate a first data bitmap;
a bitmap splitting unit for splitting the first data bitmap according to a ratio of the first resolution to a second resolution to generate a plurality of second data bitmaps; and
an outputting and printing unit for outputting the plurality of second data bitmaps to a printer with the second resolution for printing, wherein the first resolution is higher than the second resolution,
wherein
the bitmap splitting unit comprises:
  a first splitting unit for splitting each row of the first data bitmap into a second data bitmap according to the ratio of a first transverse resolution to a second transverse resolution where the first resolution is the first transverse resolution, the second resolution is the second transverse resolution, and the first transverse resolution is an integral multiple of the second transverse resolution,
the first splitting unit comprises:
  a first extracting unit for extracting pixels from a row of the first data bitmap for h times, wherein the pixels extracted in each time form a sub-row, and one pixel is extracted from every h pixels of the row in each time of extraction, and
  a first constructing unit for constructing second data bitmaps by using each sub-row; and
the outputting and printing unit comprises:
  a first printing unit for outputting all of the sub-rows of a second data bitmap to the printer row by row for printing, driving an ink head of the printer to move a first distance rightwards from an origin before each sub-row is printed, and driving the ink head of the printer to move back to the origin and then to move downwards to a next row after each sub-row is printed completely, wherein the first distance is the product of dh and the row number of the sub-row minus 1, h is a ratio of the first transverse resolution to the second transverse resolution, and dh is a transverse moving distance of the ink head and is the reciprocal of the first transverse resolution.

9. The device according to claim 8, wherein
the first splitting unit comprises:
  a first supplementing unit for adding blank pixels to a row of the first data bitmap, where the number of pixels included in the row is not an integral multiple of the ratio of the first transverse resolution to the second transverse resolution, so that the number of pixels included in the row supplemented with the blank pixels is an integral multiple of the ratio of the first transverse resolution to the second transverse resolution,
  a second extracting unit for extracting pixels from the row of the first data bitmap for h times, wherein the pixels extracted in each time form a sub-row, and one pixel is extracted from every h pixels of the row, and
  a second constructing unit for constructing second data bitmaps by using each sub-row; and
the outputting and printing unit comprises:
  a second printing unit for outputting all of the sub-rows of a second data bitmap to the printer row by row for printing, driving an ink head of the printer to move a first distance rightwards from an origin before each sub-row is printed, and driving the ink head of the printer to move back to the origin and then to move downwards to a next row after each sub-row is printed completely, wherein the first distance is the product of dh and the row number of the sub-row minus 1, h is a ratio of the first transverse resolution to the second transverse resolution, and dh is a transverse moving distance of the ink head and is the reciprocal of the first transverse resolution.

10. A device for printing images, comprising:
a rasterization processing unit for rasterizing an image to be printed in view of a first resolution to generate a first data bitmap;
a bitmap splitting unit for splitting the first data bitmap according to a ratio of the first resolution to a second resolution to generate a plurality of second data bitmaps; and
an outputting and printing unit for outputting the plurality of second data bitmaps to a printer with the second resolution for printing, wherein the first resolution is higher than the second resolution,
wherein
the bitmap splitting unit comprises:
  a second splitting unit for extracting rows from the first data bitmap according to a ratio of a first longitudinal resolution to a second longitudinal resolution and forming second data bitmaps by the extracted rows, respectively, where the first resolution is the first longitudinal resolution, the second resolution is the second longitudinal resolution, and the first longitudinal resolution is an integral multiple of the second longitudinal resolution,
the second splitting unit comprises:
  a third extracting unit for extracting data for v times from every N*v rows of the first data bitmap, wherein one row is extracted from every v rows of the N*v rows, v is the ratio of the first longitudinal resolution to the second longitudinal resolution, and N is the number of nozzles of the ink head of the printer, and
  a third constructing unit for forming a second data bitmap by rows extracted in each time; and
the outputting and printing unit comprises:
  a third printing unit for outputting the second data bitmaps formed through v times of extraction to the printer for printing, driving the ink head of the printer to move downwards for a distance of dv after each second data bitmap is printed completely, and driving the ink head of the printer to move downwards a second distance after the second data bitmaps formed through v times of extraction are printed completely, wherein the second distance is N*v*dv, and dv is a longitudinal moving distance of the ink head and is the reciprocal of the first longitudinal resolution.

11. The device according to claim 10, wherein
the second splitting unit comprises:
  a second supplementing unit for adding blank rows to the first data bitmap, where the number of rows of the first data bitmap is not an integral multiple of N*v, so that the number of rows of the first data bitmap supplemented with the blank rows is an integral multiple of N*v,
  a fourth extracting unit for extracting data for v times from every N*v rows of the first data bitmap, wherein one row is extracted from every v rows of the N*v rows, v is the ratio of the first longitudinal resolution to the second longitudinal resolution, and N is the number of nozzles of the ink head of the printer, and a fourth constructing unit for forming a second data bitmap by rows extracted in each time; and the outputting and printing unit comprises:

a fourth printing unit for outputting the second data bitmaps formed through v times of extraction to the printer for printing, driving the ink head of the printer to move downwards for a distance of dv after each second data bitmap is printed completely, and driving the ink head of the printer to move downwards a second distance after the second data bitmaps formed through v times of extraction are printed completely, wherein the second distance is N*v*dv, and dv is a longitudinal moving distance of the ink head and is the reciprocal of the first longitudinal resolution.

12. A device for printing images, comprising:

a rasterization processing unit for rasterizing an image to be printed in view of a first resolution to generate a first data bitmap;

a bitmap splitting unit for splitting the first data bitmap according to a ratio of the first resolution to a second resolution to generate second data bitmaps; and an outputting and printing unit for outputting the second data bitmaps to a printer with the second resolution for printing, wherein the bitmap splitting unit comprises a third splitting unit, the first resolution comprises a first transverse resolution and a first longitudinal resolution, the second resolution comprises a second transverse resolution and a second longitudinal resolution, the first transverse resolution is an integral multiple of the second transverse resolution, and the first longitudinal resolution is an integral multiple of the second longitudinal resolution, the third splitting unit is configured for:

extracting rows from the first data bitmap according to a ratio of the first longitudinal resolution to the second longitudinal resolution so that the extracted rows form a third data bitmap; and splitting the third data bitmap into a plurality of second data bitmaps according to a ratio of the first transverse resolution to the second transverse resolution.

13. The device according to claim 12, wherein the third splitting unit comprises:

a fifth extracting unit for extracting data for v times from every N*v rows of the first data bitmap, wherein one row is extracted from every v rows of the N*v rows, v is a ratio of the first longitudinal resolution to the second longitudinal resolution, and N is the number of nozzles of the ink head of the printer, a fifth constructing unit for forming a third data bitmap by rows extracted in each time, a sixth extracting unit for extracting data from the third data bitmap for h times, wherein a plurality of pixels are extracted from each row of the third data bitmap and form one sub-row, one pixel is extracted from every h pixels of the row, and h is a ratio of the first transverse resolution to the second transverse resolution, a sixth constructing unit for forming a second data bitmap by sub-rows extracted in each time, and a fourth supplementing unit, wherein if the number of rows of the first data bitmap is not an integral multiple of N*v, the fourth supplementing unit adds blank rows to the first data bitmap so that the number of rows of the first data bitmap supplemented with the blank rows is an integral multiple of N*v, and if the number of pixels included in a row of the first data bitmap is not an integral multiple of h, the fourth supplementing unit adds blank pixels to the row so that the number of pixels included in the row supplemented with the blank pixels is an integral multiple of h;

the outputting and printing unit comprises:

a fifth printing unit for outputting the second data bitmaps obtained by splitting the third data bitmap to the printer one by one for printing, in which N rows are printed synchronously, driving the ink head of the printer to move a first distance rightwards from an origin of the row before each second data bitmap is printed, driving the ink head of the printer to move back to the origin and then to move downwards for a distance of dv after the third data bitmap is printed completely, and driving the ink head of the printer to move downwards for a second distance after the v third data bitmaps formed through v times of extraction are printed completely, wherein the first distance is the product of dh and the bitmap number of the current second data bitmap minus 1, the second distance is N*v*dv, dh is a transverse moving distance of the ink head and is the reciprocal of the first transverse resolution, and dv is a longitudinal moving distance of the ink head and is the reciprocal of the first longitudinal resolution.

14. The device according to claim 12, wherein the third splitting unit comprises:

a third supplementing unit for adding z*v blank rows to the front of the first data bitmap, wherein z is a prime number larger than v and less than N/2, v is the ratio of the first longitudinal resolution to the second longitudinal resolution, and N is the number of nozzles of the ink head of the printer, a seventh extracting unit for extracting data for v times from every N*v rows of the first data bitmap, wherein one row is extracted from every v rows of the N*v rows, a seventh constructing unit for forming a third data bitmap by rows extracted in each time, an eighth extracting unit for extracting data from the third data bitmap for h times, wherein a plurality of pixels are extracted from each row of the third data bitmap and form one sub-row, one pixel is extracted from every h pixels of the row, and h is a ratio of the first transverse resolution to the second transverse resolution, an eighth constructing unit for forming a second data bitmap by sub-rows extracted in each time, and a fifth supplementing unit for adding blank pixels to a row of the first data bitmap, where the number of pixels included in the row of the first data bitmap is not an integral multiple of h so that the number of pixels included in the row supplemented with the blank pixels is an integral multiple of h;

the outputting and printing unit comprises:

a sixth printing unit for outputting the second data bitmaps to the printer one by one for printing, in which N rows are printed synchronously, driving the ink head of the printer to move a first distance rightwards from an origin before each second data bitmap is printed, driving the ink head of the printer to move back to the origin and then to move downwards for a third distance after each second data bitmap is printed completely, wherein the first distance is the product of dh and the bitmap number of the current second data bitmap minus 1, the third distance is $z*dv$, dh is a transverse moving distance of the ink head and is the reciprocal of the first transverse resolution, and dv is a longitudinal moving distance of the ink head and is the reciprocal of the first longitudinal resolution.

* * * * *